D. B. LEE.
MACHINE FOR MANUFACTURING TUBING.
APPLICATION FILED MAR. 14, 1919. RENEWED FEB. 23, 1922.
1,424,171.
Patented Aug. 1, 1922.
4 SHEETS—SHEET 1.
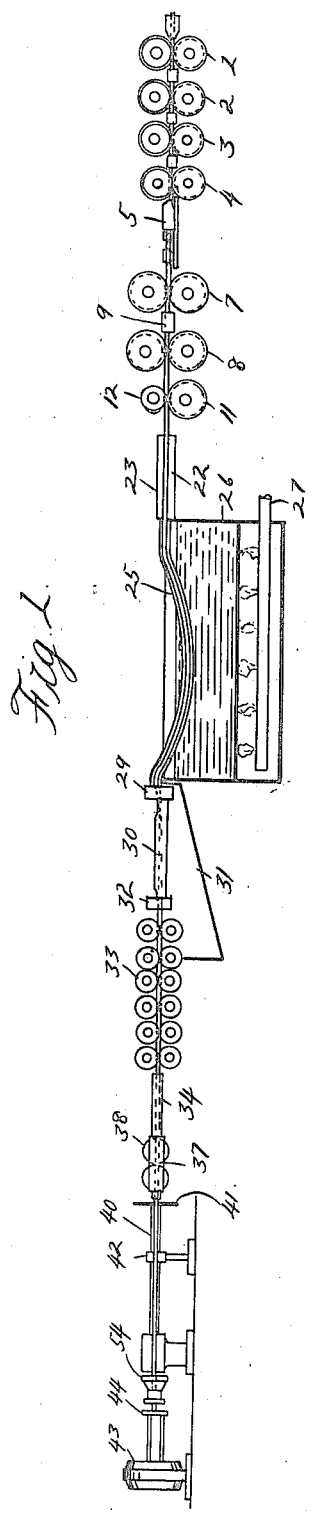
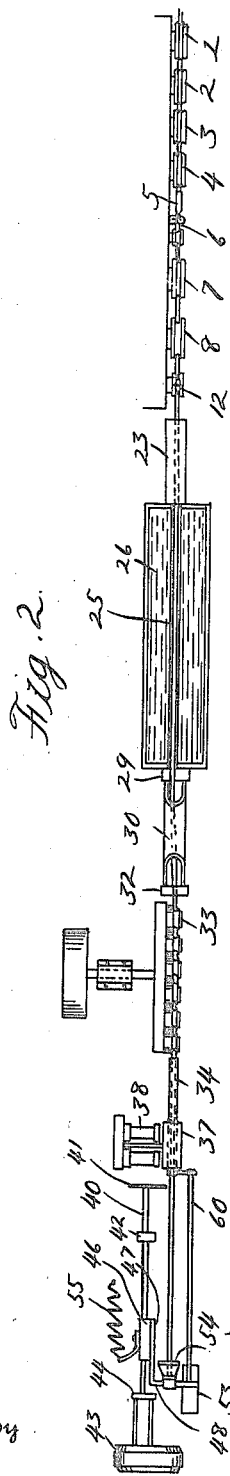
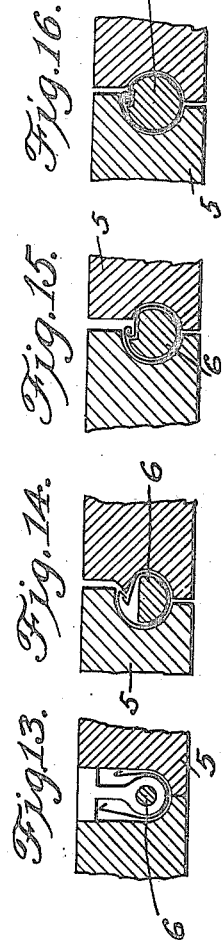
Inventor
Dwight B. Lee
By Whittemore
Hulbert & Whittemore
Attorneys D. B. LEE.
MACHINE FOR MANUFACTURING TUBING.
APPLICATION FILED MAR. 14, 1919. RENEWED FEB. 23, 1922.
1,424,171.
Patented Aug. 1, 1922.
4 SHEETS—SHEET 2.
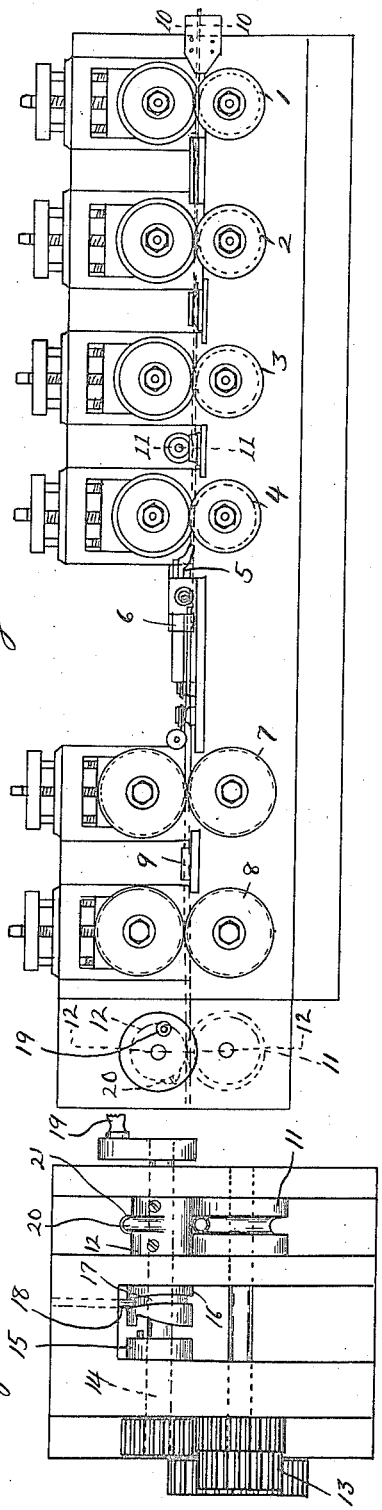
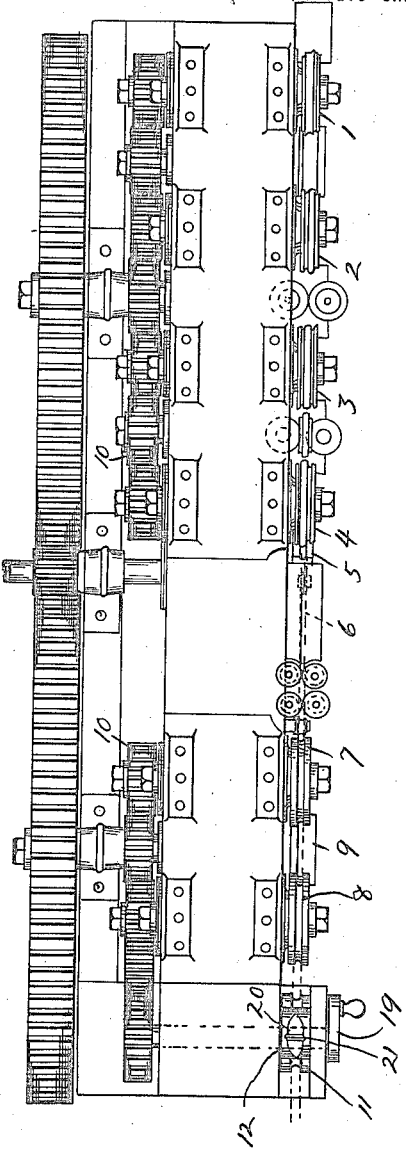
Inventor
Dwight B. Lee
By Whittemore Hulbert & Whittemore
Attorneys

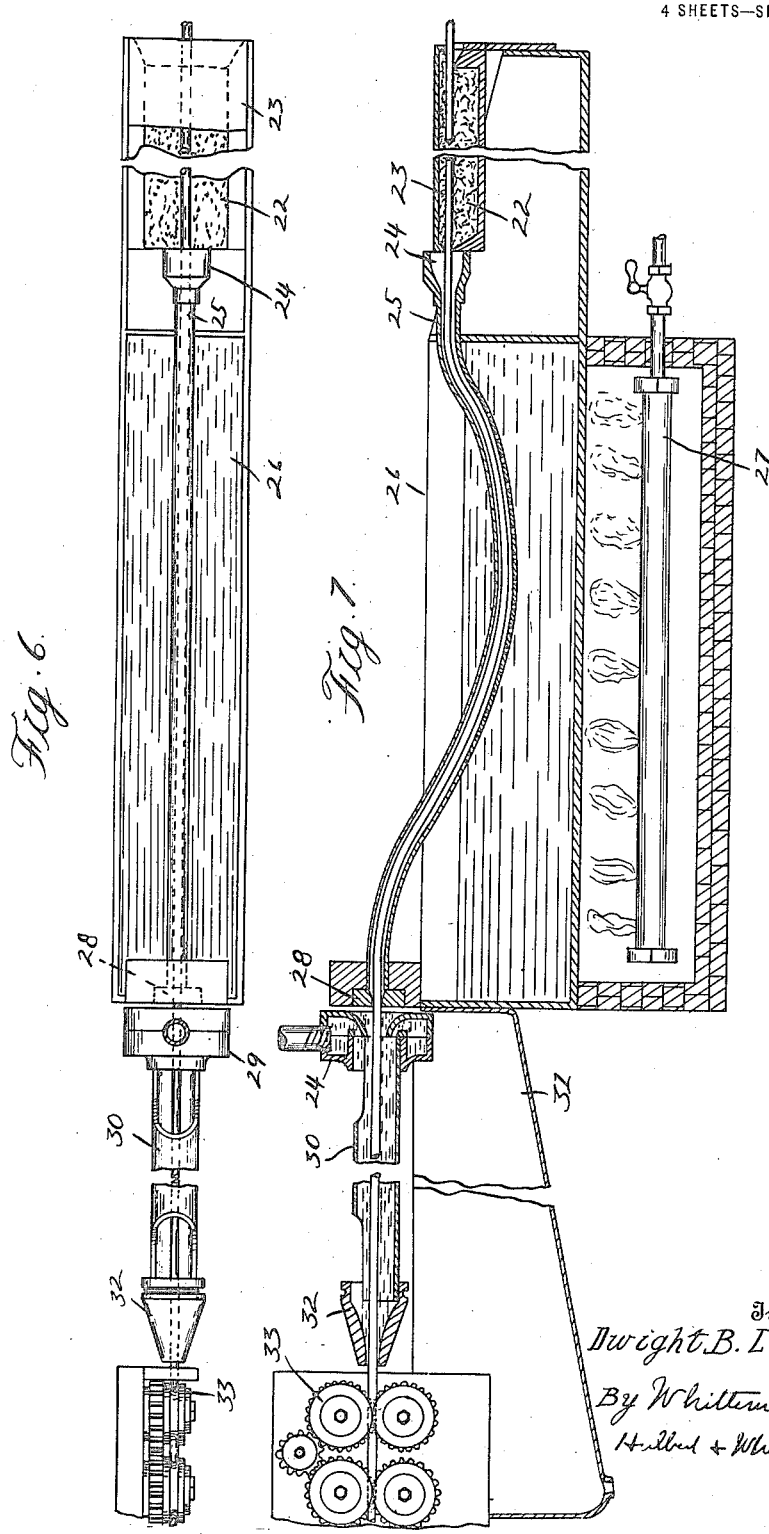

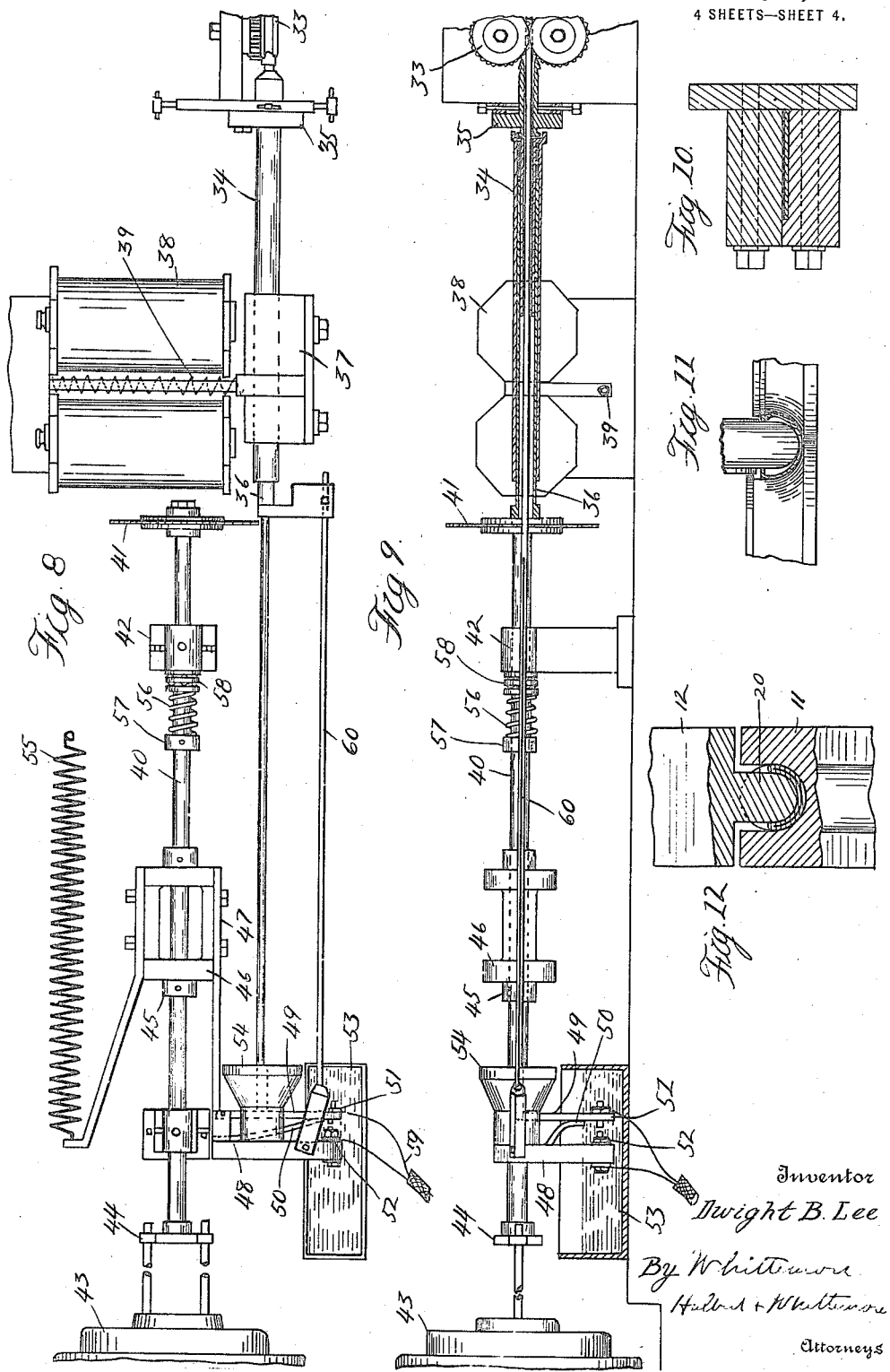

UNITED STATES PATENT OFFICE.

DWIGHT B. LEE, OF DETROIT, MICHIGAN, ASSIGNOR TO MOTOR PRODUCTS CORPORATION, OF DETROIT, MICHIGAN, A CORPORATION OF MICHIGAN.

MACHINE FOR MANUFACTURING TUBING.

1,424,171.                  Specification of Letters Patent.        Patented Aug. 1, 1922.

Application filed March 14, 1919, Serial No. 282,595. Renewed February 23, 1922. Serial No. 538,797.

*To all whom it may concern:*

Be it known that I, DWIGHT B. LEE, a citizen of the United States of America, residing at Detroit, in the county of Wayne and State of Michigan, have invented certain new and useful Improvements in Machines for Manufacturing Tubing, of which the following is a specification, reference being had therein to the accompanying drawings.

The invention relates to the manufacture of metallic tubing of that type in which the tube is first formed up from sheet metal with a locked seam, the seam being soldered to effectually seal the same.

It is the object of the invention to obtain an organized mechanism for performing all of the operations necessary to the completion of the tubing and the delivery of the same in severed sections of predetermined length. To this end the invention comprises the construction as hereinafter set forth.

In the drawings:

Figure 1 is a diagrammatic sectional side elevation, and Figure 2 is a diagrammatic plan view of the machine;

Figure 3 is a side elevation of the tube forming mechanism;

Figure 4 is a plan view thereof;

Figure 5 is an end elevation of the tube closing mechanism;

Figures 6 and 7 are respectively a plan and longitudinal section through the tube soldering device;

Figures 8 and 9 are respectively a plan view and sectional side elevation of the tube severing mechanism;

Figures 10 to 12 are cross-sections on lines of corresponding number of Figure 3;

Figures 13 to 16 inclusive are cross-sections through the die-member to illustrate the manner of closing the tube.

Generally described, the invention comprises tube-forming means, seam-soldering means and tube-severing means arranged in series together with advancing means operating upon the metallic strip from which the tubing is formed and also upon the formed tubing at a series of spaced points in the path of advancement and producing a cumulative effect. This organization has a distinct advantage over the performing of the several operations in separate and distinct machines, inasmuch as the pull upon the tubing passing through the soldering and straightening devices greatly assists in carrying the portion of the strip which is being formed into the closed tube and avoids the clogging and stopping of the mechanism. A further advantage is that the tubing may be formed from strips of relatively great length and at the same time the mechanism may be compactly arranged as the delivered tubing is cut into short lengths.

1, 2, 3 and 4 are pairs of co-operating forming rolls which successively operate upon a metallic strip to form on the opposite edge portions thereof hooked flanges for the seam, and which also bend the strip into a U-cross-section. 5 is a die member for engaging the U-shaped strip and 6 is a mandrel extending into the die 5 and around which the tube is closed, the hooked flanges engaged and the seam pressed into locking engagement. 7 and 8 are pairs of rolls engaging the completely closed tubing, and 9 is a die intermediate said rolls for slightly reducing the diameter of the tube; the rolls 7 and 8 being preferably driven at slightly greater peripheral speed than the rolls 1, 2, 3 and 4. This greater speed is accomplished by slightly increasing the diameter of the rolls 7 and 8 and by driving all of the rolls at the same angular speed through the medium of gearing 10.

The soldering means is located in advance of the tube-forming mechanism, but to avoid the entrance of solder into the tubing the forward end must be closed. This is accomplished by a closing mechanism which, as specifically shown, includes a grooved roll 11 and a co-operating rotatable member 12. The roll 11 is constantly driven by gearing 13, but the member 12 is normally stationary and is only rotated upon the actuation of a clutch. Preferably the member 12 is sleeved upon a rotating shaft 14 which has a clutch member 15 thereon adjacent to a co-operating member 16 on the sleeve 12. The member 16 has a cammed groove 17 therein engaging a stationary pin 18 which normally is in engagement with a portion of the cammed groove which holds the member 16 out of engagement with the co-operating member 15. There is, however, provided an operating crank handle 19 which when slightly actuated to rotate the member 16 will throw the clutch members into engagement through the cam action of the groove 17 upon the pin 18. The sleeve 12 will then rotate with the shaft 14 through one complete revolution, at the end of which the pin 18 again entering the portion of the groove 17 which it originally engaged will move the member 16 out of operative relation with the member 15. The member 12 has projecting therefrom a die member 20 carrying a shearing edge 21. The die 20 is of a shape to press the upper portion of the tubing down into and in parallelism to the lower portion of the tubing in the groove 11, and at the same time the severing blade 21 will cut the tubing in the plane of contact between the upper and lower portions thereof. The effect of the mechanism is therefore to close the end of the tube without enlarging the diameter thereof, so that there is nothing to obstruct its further movement through the machine.

The soldering apparatus comprises a fluxing pad 22 having a lower section and a hinged upper section 23 which, after the forward end of the tubing has passed, may be turned down thereupon. These pads will flux the seam of the tubing, which then passes forward into the flaring mouth 24 of a guide tube 25, which latter is above a container 26 for molten solder heated by the burner 27. The tube 25 is bent in a curved form to depress a portion thereof beneath the surface of the molten solder and then to rise again above the surface and out beyond the container. The tube 25 is perforated so that the molten solder can enter therein, coming in contact with the fluxed seam and thoroughly sweating the joint. 28 is a stripping die at the end of the tube 25 which wipes off all the surplus solder.

Beyond the soldering apparatus is arranged a washing and cooling apparatus, preferably an annular water-head 29 for jetting a conical stream of water upon the advancing tubing, and 30 is a surrounding casing for the water which drains therefrom into a receptacle 31. At the end of the cooling device is a flaring mouth piece 32 for guiding the end of the tubing into engagement with a series of rolls 33, these operating to straighten the tube, taking out any bends therein incident to its passage through the guide tube 25. The rolls 33 are driven at slightly greater peripheral speed than the rolls 7 and 8 so as to exert a tension upon the tubing and to assist in drawing the same through not only the soldering device, but also the forming mechanism.

Beyond the straightening rolls 33 is arranged the cut off mechanism which includes a guide tube 34 having a pivotal engagement with a stationary guide 35 and also having a telescopic extension 36. The tube 34 is mounted upon an armature 37 of an electromagnet 38, a spring 39 holding said armature in retracted position. 40 is a revoluble arbor arranged parallel to the guide 34 and having mounted thereon the saw or cutter 41. The arbor is longitudinally adjustable in bearings 42 and is driven from an electric motor or other driving mechanism 43 through the medium of a coupling 44 permitting the longitudinal movement of the arbor. 45 are collars secured to the arbor upon opposite sides of a sleeve 46 which carries an arm 47 having a laterally extending portion 48 projecting into the path of the tubing delivered from the guide 34. Mounted upon the portion 48 is a pivotal arm 49 having a spring 50 for holding it normally slightly separated from the member 48. 51 and 52 are electric contact members for a circuit closing switch, said members being preferably immersed in a container 53 for oil or other dielectric fluid. 54 is a flaring guide for receiving the end of the tubing and directing it against the arm 49. 55 is a spring for retracting the sleeve 46, and 56 is a bigger spring upon the arbor 40 between a collar 57 thereon and an anti-friction bearing 58 adjacent to the stationary bearing 42.

With the construction just described the tube delivered from the rolls 33 passes through the tubular guide 34 and beyond the same until it enters the flaring mouth 54 and is directed against the arm 49. The pressure of the tubing upon this arm will cause the movement of the same to close the electric closer which controls through the electric circuit 59 the magnet 38. This magnet when energized attracts the armature 37, drawing the guide 34 laterally and thereby carrying the tubing across the path of the saw. At the same time the pressure of the forward end of the tubing against the lever 49 and arm 48 will draw the sleeve 46 forward and through the medium of the collars 45 will carry the arbor 40 and saw 41. Thus the saw during the cutting operation advances at the same rate as the tubing, while the pressure of the following tubing against the saw will continue the advancement until the section is completely severed. When, however, this occurs the rotation of the saw throws out the severed section and permitting the opening of the circuit closer by the action of the spring 50 will break the electric circuit, de-energize the magnet 38 and permit the spring 39 to draw the guide and tubing out of the path of the saw. The spring 55 then returns the arbor and saw to their initial positions. During the operation just described the telescopic extension 36 of the guide tube 34 is moved forward with the saw and advancing tubing through a connecting rod 60 which extends from the arm 48 to the member 36. This maintains the guide adjacent to the saw to take the pressure against the tubing.

When the machine is in operation there is is nothing to interrupt the continuity of its action, as the metallic strips may be of great length, and, if desired, succeeding strips may be coupled to each other so that there will be no interruption in the operation. By reason of the fact that the speed of the feed rolls is progressively advanced all portions of the tubing are maintained under proper tension, while the cumulative effect of the power is to advance the strip at a constant rate.

What I claim as my invention is:—

1. In a metallic tube forming machine, the combination of tube forming and closing mechanism, a solder bath, and means for continuously advancing a metallic strip successively through said tube forming and closing mechanism and immersing the formed tube in said solder bath.

2. In a metallic tube forming machine, the combination of tube forming and closing mechanism, a receptacle containing molten solder, and means operating upon the metallic strip and the formed tube for continuously advancing the same successively through said tube forming and closing mechanism and through said receptacle and beneath the surface of the molten solder therein.

3. In a metallic tube forming machine, the combination of tube forming and closing mechanism, a solder bath, and means operating upon the unformed and formed metallic strip to continuously advance the same through said tube forming and closing mechanism and immerse the same in said solder bath, said advancing means being of progressively increasing speed to operate with cumulative force upon the unformed and formed strip to maintain all portions thereof under tension.

4. In a metallic tube forming machine, the combination of tube forming and closing mechanism, a solder bath, a device for severing the soldered tubing into predetermined lengths, and means for continuously advancing the unformed and formed metallic strip successively through said tube forming and closing mechanism, immersing the same in said solder bath and through said severing device.

5. In a metallic tube forming machine, the combination of mechanism for forming and closing seamed tubing, a solder bath, and means for continuously advancing a metallic strip of indeterminate length successively through said forming and closing mechanism and immersing the seam formed in the tube in said solder bath.

6. In a tube forming machine, the combination of means for advancing and progressively forming a strip of indeterminate length into a lock seam tube, and means for subsequently soldering the seam thus formed during the advancement of the strip and tube.

7. In a metallic tube forming machine, the combination of means for advancing and progressively forming a strip of indeterminate length into a lock seam tube, means for subsequently soldering the seam thus formed during the advancement of the strip and tube, and means for cutting predetermined lengths of the tube subsequent to the soldering operation.

8. In a metallic tube forming machine, the combination of means for advancing and progressively forming a flat metallic strip of indeterminate length into a lock seam tube, a common means for subsequently heating and sealing the lock-seam thus formed during the advancement of the strip and tube.

9. In a metallic tube forming machine, the combination of means for continuously advancing and progressively forming a flat metallic strip into a lock-seam tube, means for subsequently soldering the seam thus formed, means for straightening the soldered lock-seam tube, and means for then cutting the soldered lock-seam tube into predetermined lengths.

10. In a metallic tube forming machine, the combination of means for advancing and progressively forming a flat metallic strip of indeterminate length into a lock-seam tube, a solder bath, and means for immersing the lock-seam of the tube in said solder bath.

11. In a metallic tube-forming machine, the combination with mechanism for forming and closing the tube, of a soldering bath, means for continuously advancing a metallic strip through said forming means and soldering bath, and means intermediate the forming means and soldering bath for closing the forward end of the advancing tubing.

In testimony whereof I affix my signature.

DWIGHT B. LEE.